US009315226B2

(12) United States Patent
Lewicki

(10) Patent No.: US 9,315,226 B2
(45) Date of Patent: Apr. 19, 2016

(54) LIGHT REFLECTIVE BICYCLE WHEEL ATTACHMENT

(71) Applicant: Mark Eric Lewicki, Concord, CA (US)

(72) Inventor: Mark Eric Lewicki, Concord, CA (US)

(*) Notice: Subject to any disclaimer, the term of this patent is extended or adjusted under 35 U.S.C. 154(b) by 0 days.

(21) Appl. No.: 14/462,749

(22) Filed: Aug. 19, 2014

(65) Prior Publication Data

US 2015/0049398 A1 Feb. 19, 2015

Related U.S. Application Data

(60) Provisional application No. 61/867,469, filed on Aug. 19, 2013.

(51) Int. Cl.
*G02B 5/30* (2006.01)
*B62J 6/20* (2006.01)
*G02B 5/12* (2006.01)
*B60B 1/00* (2006.01)
*B60B 7/00* (2006.01)

(52) U.S. Cl.
CPC . *B62J 6/20* (2013.01); *B60B 1/003* (2013.01); *B60B 7/0006* (2013.01); *G02B 5/12* (2013.01)

(58) Field of Classification Search
CPC ............ B62J 6/20; B62J 1/003; B62J 7/0006; G02B 5/12
USPC ........................ 359/523, 550, 842, 533, 548
See application file for complete search history.

(56) References Cited

U.S. PATENT DOCUMENTS

| | | | | |
|---|---|---|---|---|
| 2,344,542 A * | 3/1944 | Fike | ............................ | B62J 6/20 301/37.41 |
| 3,525,088 A * | 8/1970 | Thummel | ............. | B29C 70/885 359/548 |
| 3,781,082 A * | 12/1973 | Linder | ....................... | B62J 6/20 359/523 |
| 3,854,777 A * | 12/1974 | Kennedy | .................... | B62J 6/20 301/37.107 |
| 3,895,855 A * | 7/1975 | Nagel | ........................ | B62J 6/20 359/523 |
| 3,901,554 A * | 8/1975 | Kennedy | .................... | B62J 6/20 301/37.41 |
| 3,950,076 A * | 4/1976 | Carlson | ....................... | B62J 6/20 301/37.41 |
| 3,951,517 A * | 4/1976 | Levy | .......................... | B62J 6/20 116/46 |
| 3,967,879 A * | 7/1976 | Tsuyama | ................... | B62J 6/20 301/37.41 |
| 4,046,397 A * | 9/1977 | Kitrell | ........................ | B62J 6/20 116/41 |
| 4,488,774 A * | 12/1984 | Kagayama | ................. | B62J 6/20 301/37.41 |
| 5,349,470 A * | 9/1994 | Alexander | ................. | B62J 6/20 116/46 |
| 5,923,483 A * | 7/1999 | Sloot | .......................... | B62J 6/20 359/523 |

* cited by examiner

*Primary Examiner* — Ricky D Shafer
(74) *Attorney, Agent, or Firm* — Plager Schack LLP

(57) ABSTRACT

A reflector assembly is configured to reflect light from within the spokes of a rim on a bicycle. The reflector assembly includes a reflective material holder having a body, fit within the spokes of a bicycle rim. A window is mechanically coupled to the body; wherein the window has covered edges and an uncovered center. A highly reflective prismatic plastic inserted into the window. The window covers edges of the highly reflective prismatic plastic are inserted into the window. The light reflects off of the highly reflective prismatic plastic to illuminate the bicycle.

4 Claims, 6 Drawing Sheets

LIGHT REFLECTIVE BICYCLE WHEEL ATTACHMENT

RELATED APPLICATION

This application claims priority to provisional patent application U.S. Ser. No. 61/867,469 filed on Aug. 19, 2013, the entire contents of which is herein incorporated by reference.

BACKGROUND

The embodiments herein relate generally to bicycles and bicycle accessories.

Prior to the disclosed invention, bicycle reflectors were not configured to adequately reflect light to warn oncoming traffic of the presence of a bicycle. Embodiments of the disclosed invention solve this problem.

SUMMARY

A reflector assembly is configured to reflect light from within the spokes of a rim on a bicycle. The reflector assembly includes a reflective material holder having a body, fit within the spokes of a bicycle rim. A window is mechanically coupled to the body; wherein the window has covered edges and an uncovered center. A highly reflective prismatic plastic inserted into the window. The window covers edges of the highly reflective prismatic plastic are inserted into the window. The light reflects off of the highly reflective prismatic plastic to illuminate the bicycle.

In some embodiments, an upper flap further comprising an upper flap fold crease is attached to the body. The upper flap is folded along the upper flap fold crease to contain the highly reflective prismatic plastic in the reflective material holder.

In some embodiments, the reflective material holder further comprises a side flap and a large flap attached to the body. The large flap is folded over the body and connected to the side flap in order to contain the highly reflective prismatic plastic in the reflective material holder. In some embodiments, snaps are attached to the large flap and the side flap in order to attach the large flap to the side flap.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
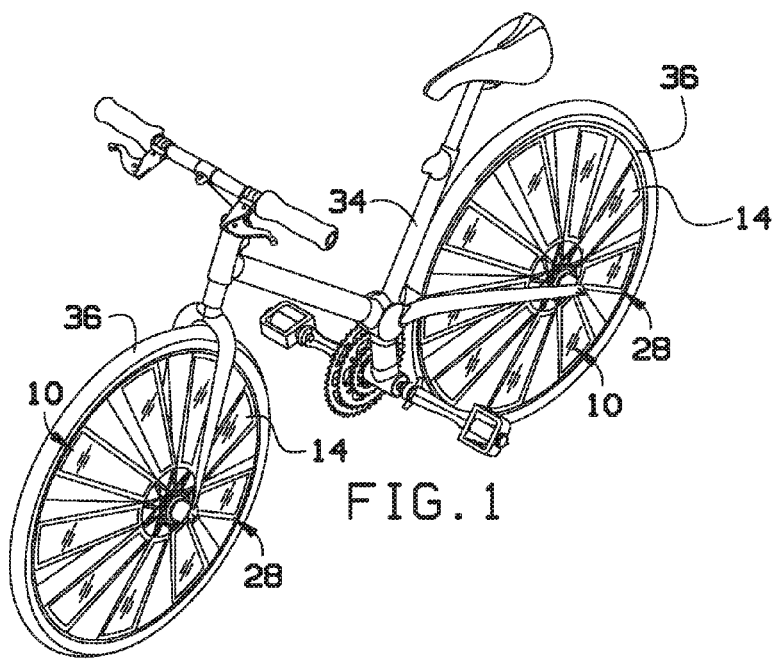
FIG. 1 is a perspective view of an embodiment shown in use.
Figure 2:
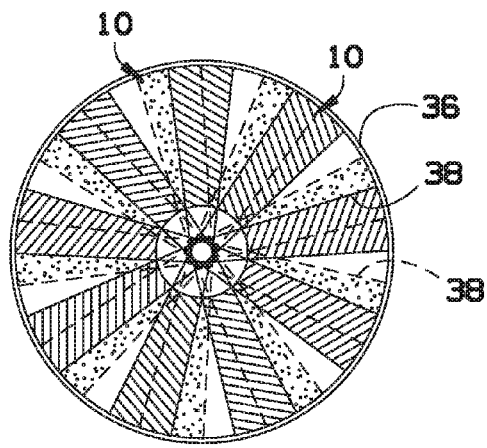
FIG. 2 is a front view of an embodiment shown applied to the rim.
Figure 3:
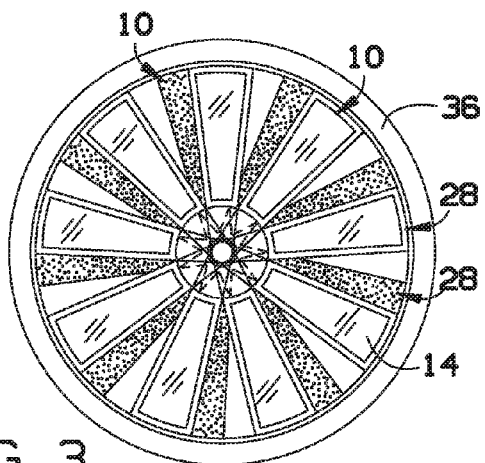
FIG. 3 is a front view of an embodiment shown applied to the rim.

By way of example, and referring to FIG. 1, FIG. 2 and FIG. 3, one embodiment of the present system comprises reflective material holder 28 arranged in a reflector assembly 10 which is capable of reflecting a significant amount of light from highly reflective prismatic plastic 14 and configured to fit on bicycle 34 between spokes 38 of rim 36. FIG. 4 through FIG. 8 below demonstrate how to accomplish this with reflector assembly 10. FIG. 9 through FIG. 16 below demonstrate how to accomplish this with reflector assembly 40.

Whether a user chooses reflector assembly 10 or reflector assembly 40 is a largely aesthetic decision except that the plurality of reflector assemblies (10, 40) should be arranged asymmetrically about a center of rim 36. This asymmetrical arrangement permits an asymmetrical reflection of light that better enables one to see the plurality of reflector assemblies.

FIG. 4 through FIG. 8 show reflector assembly 10 in more detail. Reflector assembly 10 comprises reflective material holder 28. Reflective material holder 28 is mechanically coupled to hook fasteners 26 on a first side called large flap 18 and loop fasteners 30 on a second side.

Side flap 20 is further mechanically coupled to the second side. Reflective material holder 28 is further mechanically coupled to body 16, which contains window 12. Body 16 is further mechanically coupled to upper flap 22 which can be folded along upper flap fold crease 24.

Figure 4:
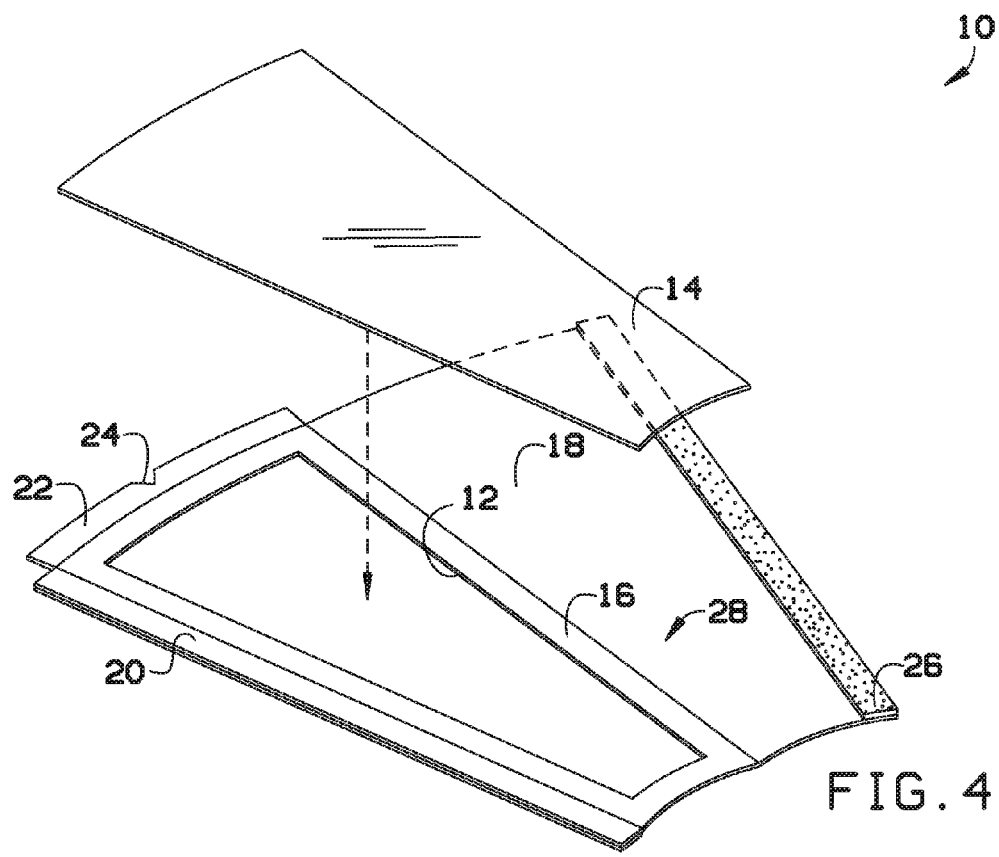
FIG. 4 is an exploded view of an embodiment.
Figure 5:
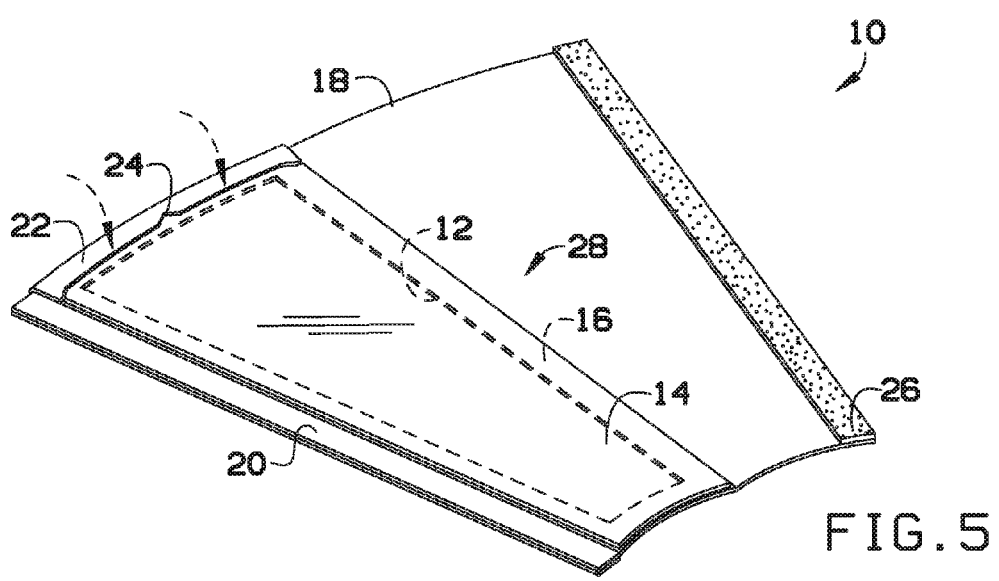
FIG. 5 is a perspective view of an embodiment of the invention, demonstrating fold over of the reflector assembly upper flap.
Figure 6:
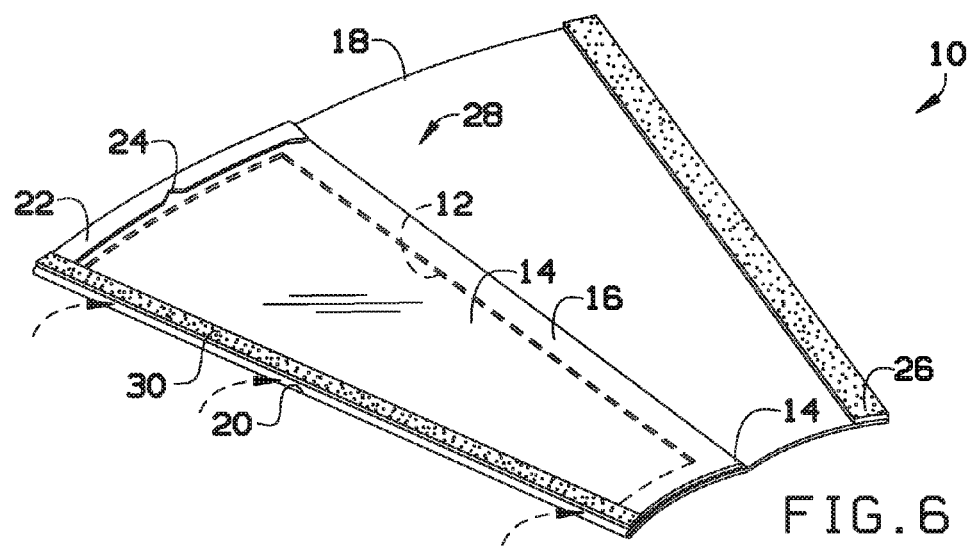
FIG. 6 is a perspective view of an embodiment of the invention, demonstrating fold over of the reflector assembly side flap.
Figure 7:
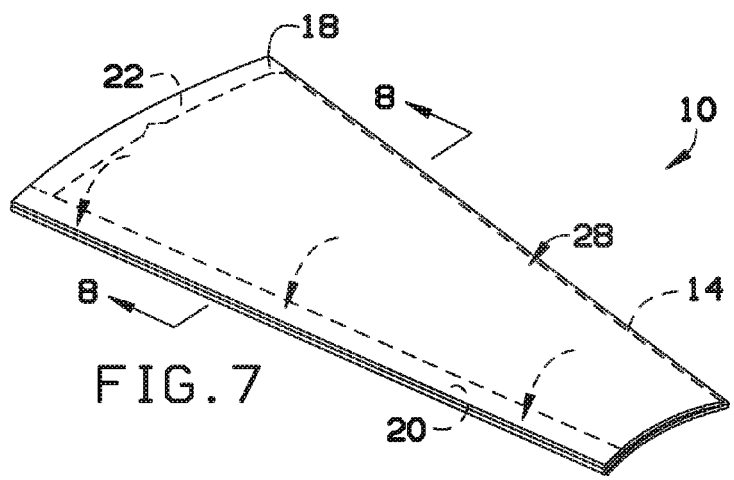
FIG. 7 is a perspective view of an embodiment of the invention, demonstrating fold over of the reflector assembly large flap

To assemble reflector assembly 10, a user inserts highly reflective prismatic plastic 14 in to body 16 as shown in FIG. 4. Next, the user folds upper flap 22 along upper flap fold crease 24 over an upper portion of highly reflective prismatic plastic 14 as shown in FIG. 5. Then, the user folds side flap 20 over a side of highly reflective prismatic plastic 14 causing loop fasteners 30 to face upward as shown in FIG. 6. After this, the user folds large flap 18 over body 16, and fastens hook fastener 26 to loop fastener 30 as shown in FIG. 7.

As used in this application a "prism" is a prism is a transparent optical element with flat, polished surfaces that refract light. A "prismatic plastic" is a plastic that has a flat, polished surfaces that refract light. A "highly reflective prismatic plastic" is a plastic that reflects a light source having a light source illuminance $L_0$ to produce a refracted light having a refracted light illuminance $L_1$; wherein $L_1 > L_0$. Put another way, the minimum coefficient of retroreflection when entering at −4 degrees should be at least 250 cd/lux/m² when observed at 0.2 degrees. The minimum coefficient of retroreflection when entering at 30 degrees should be at least 150 cd/lux/m² when observed at 0.2 degrees. The minimum coefficient of retroreflection when entering at −4 degrees should be at least 95 cd/lux/m² when observed at 0.5 degrees. The minimum coefficient of retroreflection when entering at 30 degrees should be at least 65 cd/lux/m² when observed at 0.2 degrees.

ASTM International has published Standard Specification for Retroreflective Sheeting for Traffic Control in ASTM D4956 the entire standard is available at http://www.astm.org/Standards/D4956.htm and is incorporated by reference. There are six kinds of retroreflective sheeting that are commonly used today: Type I, Type III, Type IV, Type VIII, Type IX and Type XI. Type I is a retroreflective sheeting referred to as "engineering grade" that is typically an enclosed lens glass bead sheeting. It is also available in a prismatic construction. Type III is a retroreflective sheeting referred to as "high intensity" that is typically manufactured as an encapsulated glass-bead retroreflective material or as an unmetalized microprismatic retroreflective element material. Type IV is a retroreflective sheeting referred to as "high intensity" that is typically an unmetalized microprismatic retroreflective element material. Type VIII is a retroreflective sheeting typically manufactured as unmetalized cube corner microprismatic retroreflective element material. General use type VIII sheeting is appropriate where long sight distances and narrow angles are encountered. While Type IX is similar to Type VIII in construction—a retroreflective sheeting typically manufactured as unmetalized cube corner microprismatic retroreflective element material—it is different in that highly reflective Type IX sheeting is best used at short sight distances where higher observation angles are encountered. Finally, Type XI sheeting is a retroreflective sheeting typically manufactured as unmetalized cube corner microprismatic retroreflective element material that is most effective at two of short, medium or long distances.

Figure 8:
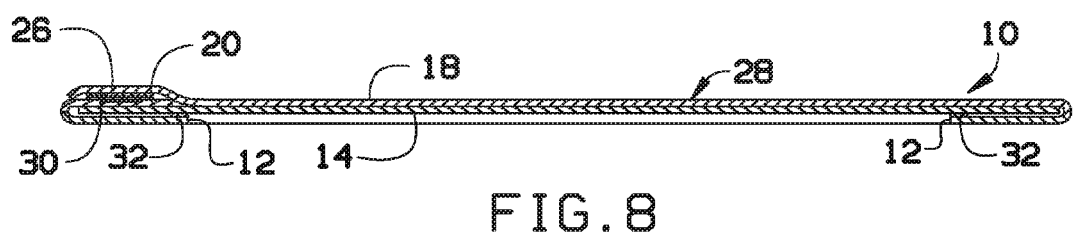
FIG. 8 is a section detail view of an embodiment of the invention along line 8-8 in FIG. 7.

Turning to FIG. 8, this process creates an assembly where highly reflective prismatic plastic 14 shows through and is surrounded by reflective material holder 28. This creates increased reflection and a stylish design that can be appreciated by young bicycle users. At the same time, some portion of reflective material holder 28 covers all edges of highly reflective prismatic plastic 14. While, it is possible that highly reflective prismatic plastic 14 could be made by stamping to a shape that fits in reflector assembly (10, 40), practically this material is presently sold in rolls and must be cut to shape. When cut, the edges of highly reflective prismatic plastic 14 are not polished and lack the prismatic properties of the top and bottom sides of highly reflective prismatic plastic 14. Accordingly, these edges are ineffective for internally refracting and externally reflecting light in a highly reflective way. To avoid that problem, these edges are covered with the portion of body 16 around window 12.

Figure 9:
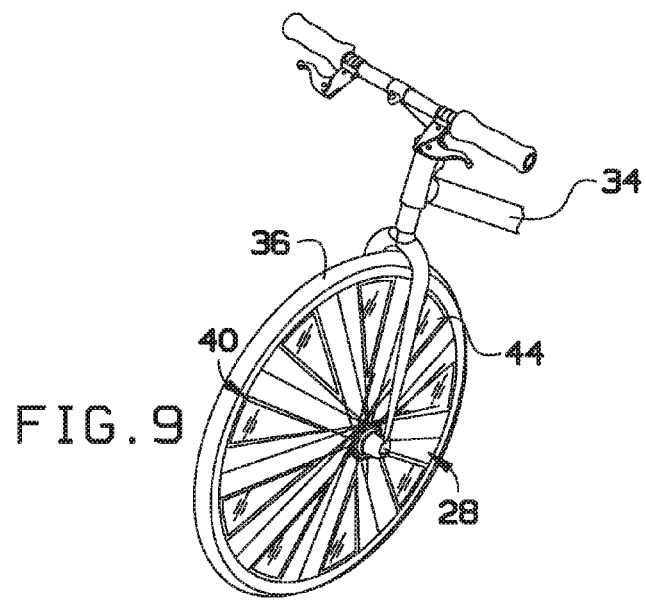
FIG. 9 is a perspective view of an embodiment shown in use.
Figure 10:
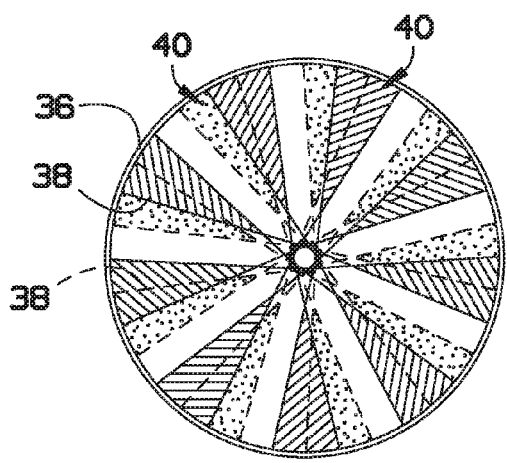
FIG. 10 is a front view of an embodiment shown applied to the rim.
Figure 11:
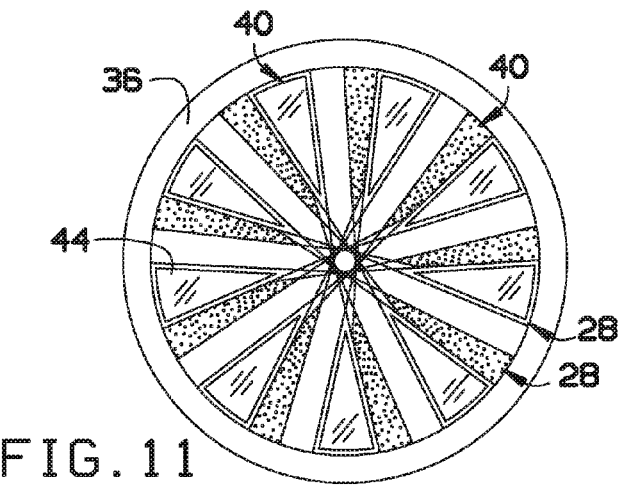
FIG. 11 is a front view of an embodiment shown applied to the rim.

Referring to FIG. 9, FIG. 10 and FIG. 11, another embodiment of the present system comprises reflective material holder 28 arranged in a reflector assembly 40 which is capable of reflecting a significant amount of light from highly reflective prismatic plastic 14 and configured to fit on bicycle 34 between spokes 38 of rim 36

FIG. 12 through FIG. 16 show reflector assembly 40 in more detail. Reflector assembly 40 comprises reflective material holder 28. Reflective material holder 28 is mechanically coupled to hook fasteners 26 on a first side called large flap 48 and loop fasteners 30 on a second side. Snaps are given as an example of a fastener, but a hook and loop fastener, zipper, buttons or a replaceable adhesive can be used.

Side flap 50 is further mechanically coupled to the second side. Reflective material holder 28 is further mechanically coupled to body 46, which contains window 42. Body 46 is further mechanically coupled to upper flap 52 which can be folded along upper flap fold crease 54.

Figure 12:
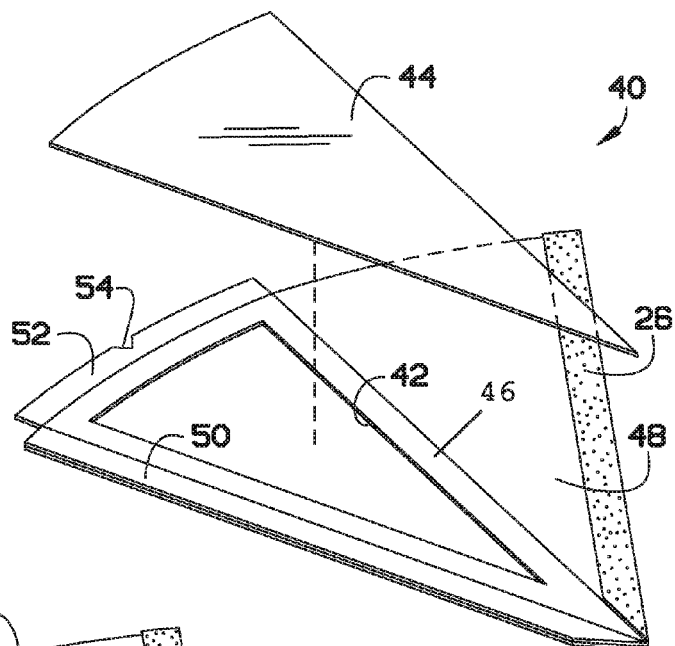
FIG. 12 is an exploded view of an embodiment.
Figure 13:
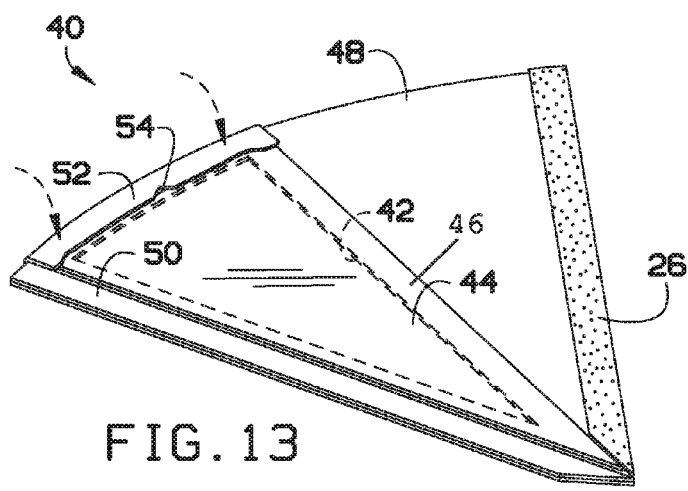
FIG. 13 is a perspective view of an embodiment of the invention, demonstrating fold over of the reflector assembly upper flap.
Figure 14:
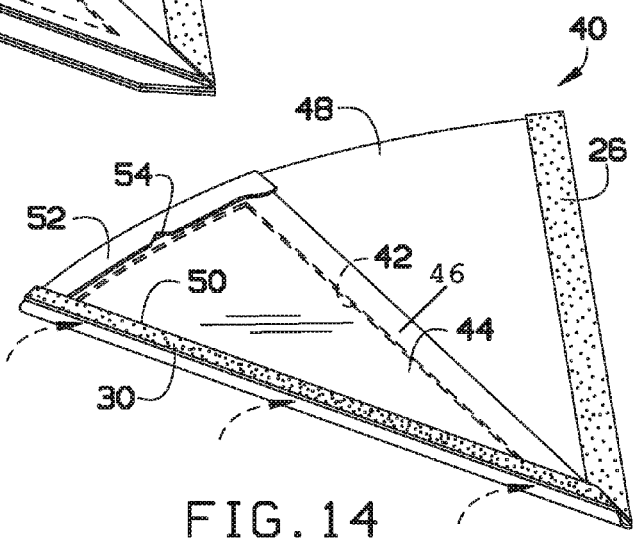
FIG. 14 is a perspective view of an embodiment of the invention, demonstrating fold over of the reflector assembly side flap.
Figure 15:
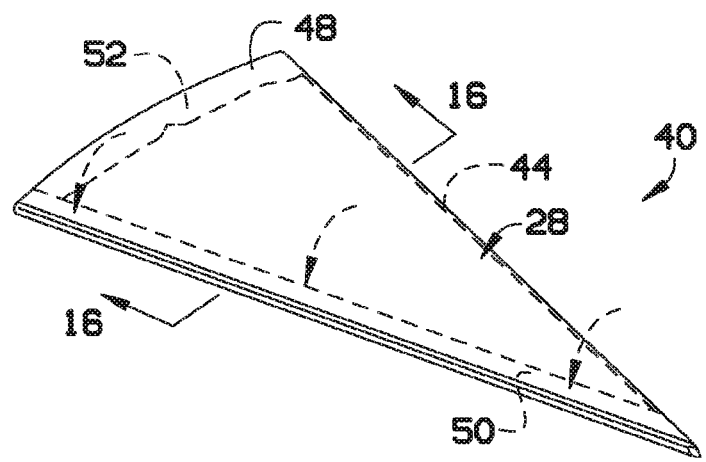
FIG. 15 is a perspective view of an embodiment of the invention demonstrating fold over of the reflector assembly large flap

To assemble reflector assembly 40, a user inserts highly reflective prismatic plastic 44 in to body 46 as shown in FIG. 12. Next, the user folds upper flap 52 along upper flap fold crease 54 over an upper portion of highly reflective prismatic plastic 44 as shown in FIG. 13. Then, the user folds side flap 50 over a side of highly reflective prismatic plastic 44 causing loop fasteners 30 to face upward as shown in FIG. 14. After this, the user folds large flap 48 over main body 46 and fastens hook fastener 26 to loop fastener 30 as shown in FIG. 15.

Figure 16:
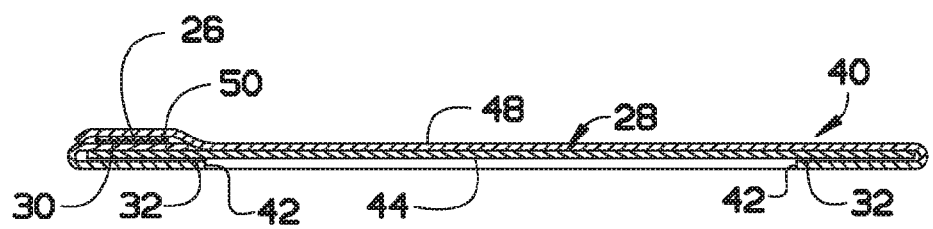
FIG. 16 is a section detail view of an embodiment of the invention along line 16-16 in FIG. 15.

Turning to FIG. 16, this process creates an assembly where highly reflective prismatic plastic 44 shows through and is surrounded by reflective material holder 28. This creates increased reflection and a stylish design that can be appreciated by young bicycle users.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A reflector assembly configured to reflect light from within spokes of a rim on a bicycle; the reflector assembly comprising:
   a reflective material holder having a body, fit within the spokes of a bicycle rim;
   a window mechanically coupled to the body; wherein the window has covered edges and an uncovered center;
   a highly reflective prismatic plastic inserted into the window; wherein edges of the highly reflective prismatic plastic inserted into the window are covered by the edges of the window;
   wherein the light reflects off of the highly reflective prismatic plastic to illuminate the bicycle.

2. The reflector assembly of claim 1, further comprising an upper flap further comprising an upper flap fold crease, attached to the body; wherein the upper flap is folded along the upper flap fold crease to contain the highly reflective prismatic plastic in the reflective material holder.

3. The reflector assembly of claim 1, wherein the reflective material holder further comprises a side flap and a large flap attached to the body;
   wherein the large flap is folded over the body and connected to the side flap in order to contain the highly reflective prismatic plastic in the reflective material holder.

4. The reflector assembly of claim 3, further comprising a hook and loop fastener attached to the large flap and the side flap in order to attach the large flap to the side flap.

* * * * *